United States Patent [19]
Knapp et al.

[11] 4,299,124
[45] *Nov. 10, 1981

[54] DEVICE FOR MEASURING THE MASS OF A FLOWING MEDIUM

[75] Inventors: Heinrich Knapp, Leonberg; Rudolf Sauer, Benningen; Peter Romann, Stuttgart; Udo Hafner, Ludwigsburg; Thomas Wilfert, Markgröningen; Werner Kammerer, Vaihingen, all of Fed. Rep. of Germany

[73] Assignee: Robert Bosch GmbH, Stuttgart, Fed. Rep. of Germany

[*] Notice: The portion of the term of this patent subsequent to Jul. 24, 1998, has been disclaimed.

[21] Appl. No.: 64,265

[22] Filed: Aug. 6, 1979

[30] Foreign Application Priority Data

Oct. 20, 1978 [DE] Fed. Rep. of Germany ....... 2845662

[51] Int. Cl.³ .................................................. G01F 1/68
[52] U.S. Cl. ......................................... 73/204; 73/116
[58] Field of Search ....................... 73/27 R, 204, 116; 338/25, 28, 316

[56] References Cited

U.S. PATENT DOCUMENTS

| | | | |
|---|---|---|---|
| 1,156,630 | 10/1915 | Savage | 73/204 |
| 1,260,498 | 3/1918 | Wilson | 73/204 |
| 3,971,247 | 7/1976 | Rodder | 73/204 |
| 4,074,566 | 2/1978 | Obayashi | 73/204 |
| 4,196,622 | 4/1980 | Peter | 73/204 |

*Primary Examiner*—Herbert Goldstein
*Attorney, Agent, or Firm*—Edwin E. Greigg

[57] ABSTRACT

A temperature-dependent resistor or hot wire is extended over at least three anchoring points and to improve the measuring accuracy of the hot wire and to ensure sufficiently high temperatures over the entire active length of the hot wire during a cleaning step by burning, the hot wire is configured in the shape of loops at all anchoring points and the intersecting wire sections of the loops are conductively connected with one another. Current lead wires are preferably conductively attached to the hot wire by means of which the current is conducted to an electric control device. The end anchoring points are preferably electrically heated during an interruption of the measuring process of the hot wire and the hot wire may be directed in a W-shape over anchoring points whereat the hot wire is connected to the electric current, during the measuring process, via the two central, symmetrical anchoring points and upon an interruption of the measuring process, by means of a switching device, via the two end anchoring points.

11 Claims, 10 Drawing Figures

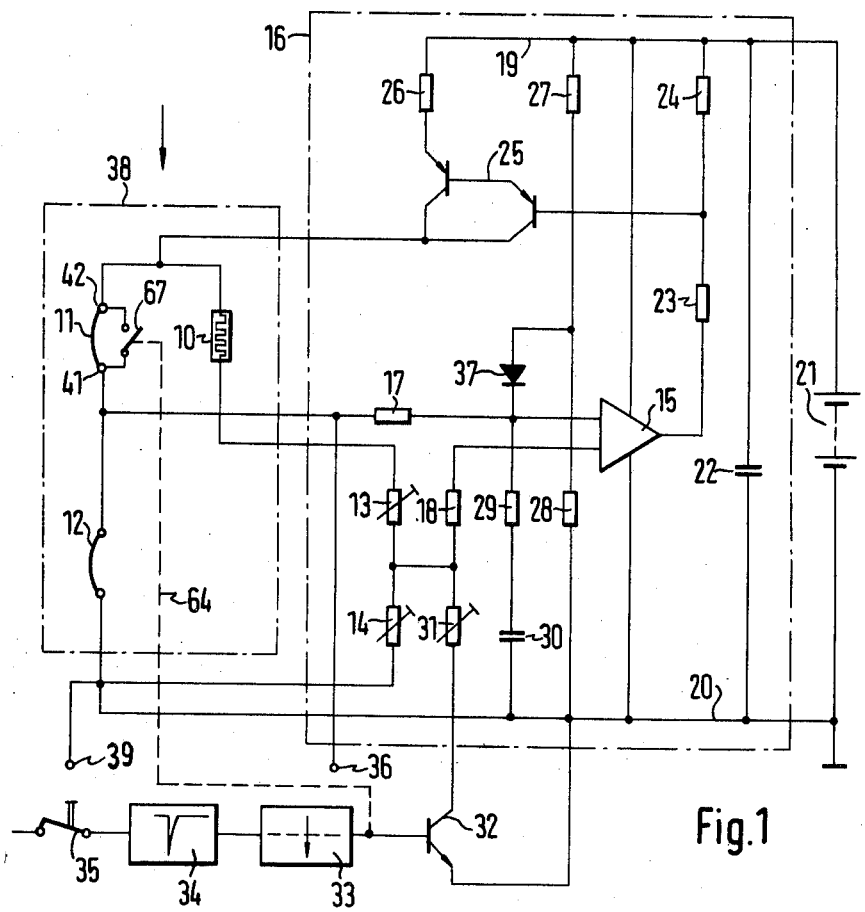
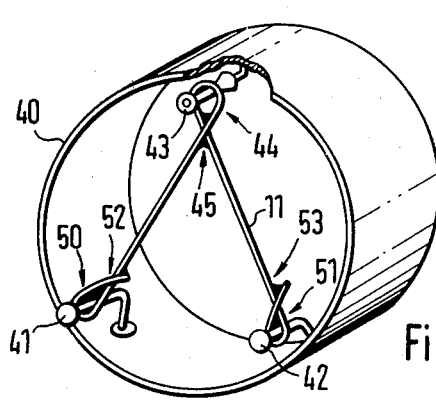
Fig.2
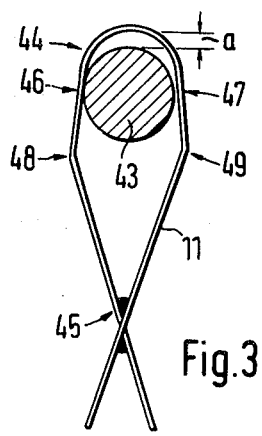
Fig.3

DEVICE FOR MEASURING THE MASS OF A FLOWING MEDIUM

CROSS REFERENCE TO RELATED APPLICATIONS

This application is an improvement and departure of the inventions found disclosed and claimed in the following applications:

| Applicant(s) | Application Serial No. | Filed | Pat. No. |
|---|---|---|---|
| Hafner & Romann | 15,994 | Feb. 28, 1980 | Now abandoned |
| — | 42,258 | — 1979 | 4,252,016 |
| Hafner & Romann | 83,696 | Oct. 11, 1979 | |
| Hafner & Romann | 136,659 | Apr. 2, 1980 | |
| Peter | 944,587 | Sept. 21, 1978 | 4,196,622 |

BACKGROUND OF THE INVENTION

The invention relates to a device for measuring the mass of a flowing medium. A device for measuring the mass of a flowing medium has been known wherein a hot wire is used as the temperature-dependent resistor, this hot wire being tautly clamped in a probe ring at several clamping points. Due to fluctuating temperatures, especially when the device is used in an automotive vehicle, there is the danger, due to the special mode of operation of the hot wire, that wire breaks occur very quickly. Furthermore, there is that disadvantage that an irregular removal of heat via the clamping points leads to an undesirable impairment of the measuring accuracy.

OBJECT AND SUMMARY OF THE INVENTION

The device according to this invention has the advantage, in contrast to the prior art, that temperature changes, especially when the device is used in an automotive vehicle, and temperature changes caused by the mode of operation of the hot wire, do not cause any measuring errors of measuring inaccuracies. By extending the hot wire over the anchoring points arranged between the end anchoring points in the form of loops, the electrical connection of the intersecting wire sections is such that the hot wire is without current at these anchoring points. It is furthermore advantageous in that no crisis is encountered if the hot wire, due to a temperature-evoked lengthening, is somewhat lifted off or displaced at the anchoring points between the end anchoring points, since this has no effect on the effective length of the hot wire. The entire active length of the hot wire is, besides, outside of the zone of the probe ring close to the wall, so that measuring inaccuracies due to the flow conditions in the zone close to the wall, which conditions are hard to cover, are avoided. Thus, more advantageous prerequisites are created for a complete burning off of residues on the hot wire during a purging annealing step.

It is also especially advantageous to fashion the wire ends as loops and to provide for the contact of these loops at the end anchoring points whereby an exactly defined length of the hot wire is obtained between the connection points of the loops.

It is furthermore especially advantageous to attach a low-ohmic current lead wire to each of the connection points of the loops at the hot wire ends, wherein the other end of each current lead wire is connected to the electrical control device of the hot wire. The current is then supplied via separate current-conducting elements arranged in the probe ring, rather than via the end anchoring points of the hot wire. The active range of the hot wire can thereby be very accurately determined.

It is likewise advantageous to attach the wire ends of the hot wire at the end anchoring points and to conductively connect a low-ohmic current lead wire to each of the end anchoring points, the other end of this lead wire being respectively connected, in an electrically conductive manner, to the hot wire at a small spacing with respect to the mounting point of the hot wire at the end anchoring point. Thereby, the active length of the hot wire is also exactly defined and an effect on the measuring result due to indefinite heat transfer in the zone of the anchoring points is avoided.

It is likewise advantageous to extend the hot wire in a W-shape through five anchoring points, wherein the symmetrical anchoring points arranged in relation to the central anchoring point are connected via current leads to an electrical control device and current is supplied to the hot wire, during the measuring step, via the two central, symmetrical anchoring points and, upon an interruption of the measuring step by means of a switching device, via the two end anchoring points so that during a purging annealing step with interruption of the measuring process, a sufficient temperature is available on the active hot wire for burning off residues on the surface.

It can likewise be advantageous, during interruption of the measuring step of the hot during the purging annealing step, to heat the end anchoring points of the hot wire, so that the heat transfer from the hot wire to the respective end anchoring point during the purging annealing step is as small as possible to attain a maximally complete burning off of residues on the surface of the hot wire.

The invention will be better understood as well as further objects and advantages thereof become more apparent from the ensuring detailed description taken in conjunction with the drawings.

BRIEF DESCRIPTION OF THE DRAWINGS

FIG. 1 shows a circuit diagram of a device for measuring the mass of a flowing medium especially for measuring the mass of intake air of internal combustion engines constructed in accordance with the invention;

FIG. 2 is a perspective schematic view of a hot wire extended in a V-shape through three anchoring points;

FIG. 3 shows a loop-shaped configuration of the hot wire in the zone of a central anchoring point;

FIG. 8 is a schematic view of a hot wire, guided in a W-shape, with its electrical connections;

FIG. 9 is an end view showing an extension of a hot wire through end anchoring points which can be heated after termination of the measuring step; and FIG. 10 is a longitudinal sectional view of a device for measuring the mass of a flowing medium constructed in accordance with the invention.

DESCRIPTION OF THE PREFERRED EMBODIMENTS

Figure 4:
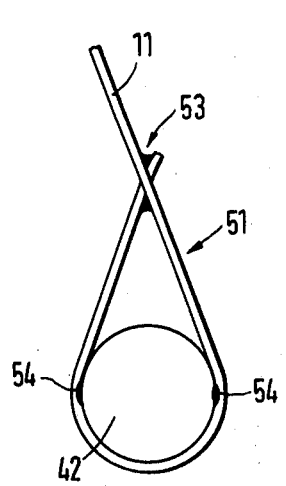
FIG. 4 shows a loop-shaped configuration of a hot wire in the zone of an end anchoring point.

In the device shown in FIG. 1 for measuring the mass of a flowing medium, especially for measuring the intake air of internal combustion engines, a bridge circuit is provided consisting of a temperature-dependent resistor 10, a temperature-dependent resistor 11, a resistor 12, and resistors 13 and 14. A control amplifier 15 of a control device 16 is connected to the bridge diagonal, the inverting input of the control amplifier 15 being connected via an input resistor 17 to the coupling point of resistors 11 and 12, while the non-inverting input of the control amplifier 15 is connected via an input resistor 18 to the coupling point of resistors 13 and 14.

The control amplifier 15 is connected via two power supply lines 19 and 20 to a DC voltage source 21. A smoothing capacitor 22 is connected in parallel to this DC voltage source 21. The output of the control amplifier 15 is connected to a series circuit of two resistors 23 and 24, wherein the resistor 24 is connected to the power line 19. These two resistors 23 and 24 constitute a voltage divider for a Darlington pair transistor circuit 25 forming together with a resistor 26 a voltage-controlled current source for supplying the bridge circuit of resistors 10, 11, 12, 13, and 14 with current.

A voltage divider comprising resistors 27 and 28 is connected between the power supply lines 19 and 20. The anode of a diode 37 is connected to the coupling point of resistors 27 and 28, the cathode of this diode being connected to the inverting input of a control amplifier 15. Between the inverting input of the control amplifier 15 and the power supply line 20, a series circuit of a resistor 29 and a capacitor 30 is connected and this resistor-capacitor combination serves for frequency-tuning the control circuit with respect to the time characteristic of the temperature-dependent resistors.

A resistor 31 is connected to the coupling point of resistors 13 and 14, this resistor 31 being connectible via the switching path of a switching transistor 32 to the power supply line 20. The base of switching transistor 32 is connected to the output of a monostable multivibrator 33 which can be triggered via a differentiating member 34 by an ignition switch 35 for the ignition unit of the internal combustion engine.

In the operation of the above-described device, a certain current flows via the temperature-dependent resistor 11 of the bridge circuit and heats this resistor 11 to its normal operating temperature. In another branch of the bridge, the temperature-dependent resistor 10 assumes a resistance value which characterizes the temperature of the flowing medium, for example the temperature of the intake air of the internal combustion engine. This has the result that the temperature of the intake air of an internal combustion engine is always utilized as the reference signal for the heating current control for the device for measuring the air mass. Depending on the mass of the passing flow of intake air, the temperature-dependent resistor 11 is cooled to a greater or lesser extent. This leads to a detuning of the bridge circuit. This detuning of the bridge circuit is stabilized by the fact that the control amplifier yields, via the voltage-controlled current source 23, 24, 25, and 26, a higher supply current for the bridge circuit, so that the temperature of the temperature-dependent resistor 11 and thus its resistance value is maintained at an at least approximately constant value. The current flowing through the bridge circuit is a measure for the air mass flowing past the temperature-dependent resistor 11. A corresponding electrical signal can be derived between a terminal 36 and a terminal 39.

To facilitate the start-up of the control device, the voltage divider of resistors 27, 28 and diode 37 is provided. During the switching on of the control device, a voltage of about 0.5 volts is applied to the inverting input of the control amplifier 15, permitting a safe start-up of the control device. During normal operation, however, the voltage at the inverting input of the control amplifier 15 will range substantially above this initial voltage, so that the diode 37 is blocked and thus no influence can be exerted on the control processes via the voltage divider 27, 28.

In order to remove deposits from the surface of the temperature-dependent resistor 11, serving as the hot wire, from time to time, an increased current flows via this temperature-dependent resistor 11 after a certain measuring cycle. The measuring cycle, in this connection, can be chosen to be, for example, a certain operating period of the internal combustion engine. It proved to be especially advantageous to trigger the annaling step each time the ignition of the internal combustion engine is switched off. This takes place when the ignition switch 35 is deactivated. The corresponding signal is differentiated and controls the monostable multivibrator 33 to assume its unstable switching condition.

During this unstable switching condition of the monostable multivibrator 33, the switching transistor 32 becomes conductive and connects the resistor 31 in parallel to the resistor 14 of the bridge circuit. Thereby, the bridge circuit of resistors 10, 11, 12, 13, and 14 is substantially detuned, namely in the sense that the control amplifier 15 yields an increased current for the bridge circuit to compensate for this detuning. This higher current heats the temperature-dependent resistor 11 to a temperature lying above the normal operating temperature for the duration of the unstable switching condition of the monostable multivibrator 33 so that residues on the surface of the temperature-dependent resistor 11 are burned off.

It proved to be especially advantageous for the material of the temperature-dependent resistor 11 to be structurally stabilized platinum wire, because this material is especially highly suitable for being heated to high temperatures. This is of special importance for the burning-off step.

The reference resistor 12 is also suitably arranged in the flow cross section, indicated by a broken line 38, for example, in the intake manifold of the internal combustion engine, because then the dissipated heat of the reference resistor 12 can be removed by the air flowing in the direction of the arrow. The resistors 13 and 14 are suitably formed as adjustable resistors so that the temperature characteristic of the control circuit can be adjusted.

FIG. 2 shows schematically a probe ring 40 with three anchoring points 41, 42, and 43. With the aid of anchoring points 41, 42, and 43, the hot wire 11 is extended in a V-shape. In this connection, the hot wire 11 is attached with its ends only to the two end anchoring points 41, 42, for example by soldering or welding, whereas the wire is only loosely guided over the anchoring point 43.

The probe ring 40 is synchronized with respect to its co-efficient of thermal expansion to the co-efficient of thermal expansion of the hot wire 11, so that changes in the length of the hot wire 11 and/or of the probe ring 40, due to thermal expansion, cause hardly any tensile or compressive stresses in the hot wire 11. Rather, such changes are extensively compensated for by variations in the specing between the anchoring points 41, 42 and 43.

The mounting of the hot wire free of tensile and compressive stresses is of extreme importance if the hot wire is to be utilized, for example, as a device for measuring the air mass in the intake manifold of an internal combustion engine. The temperature range to be considered herein is normally from −30° C. to +120° C. Additionally, a further temperature change occurs due to the mode of operation of the hot wire 11. Besides, the hot wire is also heated, as described above, to a high temperature for purging purposes, so that residues adhering to its surface can be burned off. This short-term increase in temperature likewise leads to changes in the length of the wire which, in case of a rigid mounting of the wire, can lead to tensile and compressive stresses. The V-shaped extension of the hot wire 11 and the adaptation of the co-efficients of thermal expansion of the probe ring 40 and of the hot wire 11 prevent the introduction of tensile or compressive stresses into the hot wire 11. Suitably, the probe ring 40 is made, in case the hot wire 11 consists of platinum, of a nickel-iron alloy, the co-efficient of thermal expansion of which corresponds approximately to that of platinum. It is also possible to produce the probe ring from glass, especially so-called platinum glass. The co-efficient of thermal expansion of this glass likewise corresponds extensively to that of the platinum wire, so that tensile or compressive stresses are kept away from the hot wire 11 in case of temperature changes.

As illustrated in FIG. 2, the anchoring points 41, 42, 43 can be bent into a hook shape. At least the end anchoring points 41, 42 used for the current supply, are mounted in the probe ring 40 so that they are electrically insulated therefrom. The central section of the hot wire 11, extended around the anchoring point 43, forms a loop 44, thus electrically conductively connecting the intersecting wire sections of the hot wire 11 at 45. The loop 44 is therefore without current and is not heated. There are no longer any problems with an undefined removal of heat from the hot wire 11 to the anchoring point 43 in case of changes in length and/or in case of a shifting of the hot wire 11 at the anchoring point 43. Due to the special suspension at anchoring point 43, it makes no difference, either, if the hot wire 11 is slightly lifted off the anchoring point 43 due to thermal expansions, or changes its position or is twisted.

It is especially advantageous to impart to the loop 44 for mounting the hot wire 11, the shape illustrated in FIG. 3. According to FIG. 3, the looping angle of the loop 44 is smaller than 180°. Besides, the configuration of the loop 44 is chosen so that there is a sufficiently large spacing between the two contact points 46 and 47 of the loop 44 at the anchoring point 43 and two points 48 and 49, from which the wire sections of loop 44 converge toward the junction point 45. This spacing ensures that upon expansions of the loop 44 and/or of the hot wire 11, no mechanical stresses are introduced into the hot wire 11, but rather, in accordance with the spacing indicated by a, a free movability of the loop 44 on the anchoring point 43 is ensured.

The electrically conductive connection 45 of the two intersecting wire sections is suitably effected by welding or brazing.

As illustrated in FIG. 2 and in FIG. 4 on an enlarged scale, the wire ends of the hot wire 11 are likewise formed as loops 50, 51, the intersecting wire sections of which are connected in an electrically conductive manner with each other at the connecting points 52, 53, preferably by welding or soldering, and which loop around the associated end anchoring points 41, 42 respectively. The loops 50, 51 are electrically conductively connected to the respective end anchoring points 41 and 42 at 54. Due to the formation of the hot wire 11 with loops 50, 51 at the end anchoring points 41, 42 and with loop 44 at the anchoring point 43, the advantage is attained that an exactly definable, active length of the hot wire 11 is established between the connecting points 52, 45, 53, lying in the central zone of the flow and thus are not subject to any flow irregularities in the wall region of the probe ring 40.

In conventional hot wire air mass meters, there is the disadvantage, on the one hand, that measuring inaccuracies occur due to a fluctuating heat transfer between the hot wire and the anchoring points and, on the other hand, that the heat removal from the hot wire 11 in the zone of the anchoring points, during a purging burning step, is so extensive that the hot wire, in the zone of these anchoring points, does not reach a sufficiently high temperature and is thus not purged of residues, which latter step is required for a flawless functioning of the air mass meter. Therefore, it is a further advantage in the present invention that, due to the configuration of the active hot wire 11 between the connecting points 45, 52, 53, the heat removal from the active hot wire 11 to the loops is so minor that the entire active hot wire length is heated to the temperature necessary for the purging burning step. The loops 50 and 51 are not heated during the measuring process carried out by the hot wire 11 as much as the active hot wire length between the connecting points 52, 45, 53, so that hardly any deposits form on these loops 50, 51 either. Even if any deposits which may be present on the loops 50, 51 are not entirely removed during the purging burning step, this still does not impair the measuring characteristic of the active hot wire length.

Figure 5:
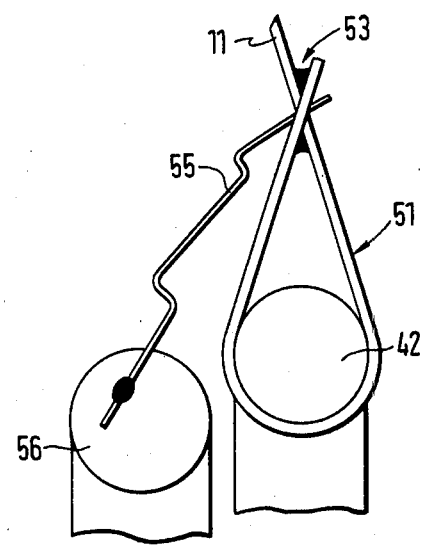
FIG. 5 shows a loop-shaped configuration of a hot wire in the zone of an end anchoring point with a separate current lead wire.

In the embodiment of FIG. 5, the hot wire 11 is guided, at the anchoring points, in each case by loops corresponding to the embodiment of FIG. 2. However, here it is unnecessary to connect the loops at the end anchoring points in each case in an electrically conductive fashion to the end anchoring points. Rather, respectively one low-ohmic current lead wire 55, especially of a noble metal, is conductively attached at the connecting points 52 and 53 of loops 50, 51 at the other end of the current lead wire 55 is electrically conductively attached to one current-conducting element 56 mounted in an insulated fashion in the probe ring 40.

In accordance with the invention, in the embodiment of FIG. 5, the connection to the electrical control device 16 is accomplished via the current-conducting elements 56 and the current lead wires 55 to the active hot wire length 11, so that, just as in the embodiment according to FIG. 2, a dissipation of heat from the loops to the anchoring points has no influence on the measuring result. Thus, the entire active hot wire length 11 can be maintained, during the purging burning step, at a sufficiently high temperature at which all deposits are removed from the active hot wire length 11.

Figure 6:
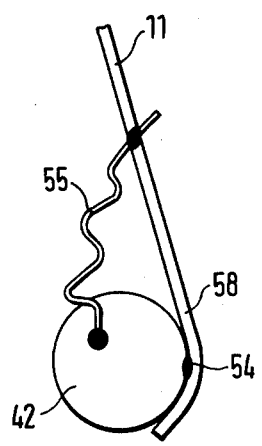
FIG. 6 shows a hot wire attached to an end anchoring point with a current lead wire serving for current supply.

The embodiment shown in FIG. 6 differs from the embodiment illustrated in FIG. 5 in that the wire ends 58 of the hot wire 11 are not attached in a loop shape to the end anchoring points 41, 42, but rather extend only partially around the end anchoring points and are connected by mounting points 54 to the end anchoring points, for example by welding or soldering. A definite electrical connection to the hot wire 11 is, however, provided by the current lead wire 55 which is attached in an electrically conductive manner, on the one hand, to the current-conducting end anchoring point and, on the other hand, to the hot wire at a small spacing with respect to the mounting points 54. In the arrangement of FIG. 6, an exactly defined active hot wire length is likewise provided and a complete combustion of the deposits is ensured during the purging burning step.

Figure 7:
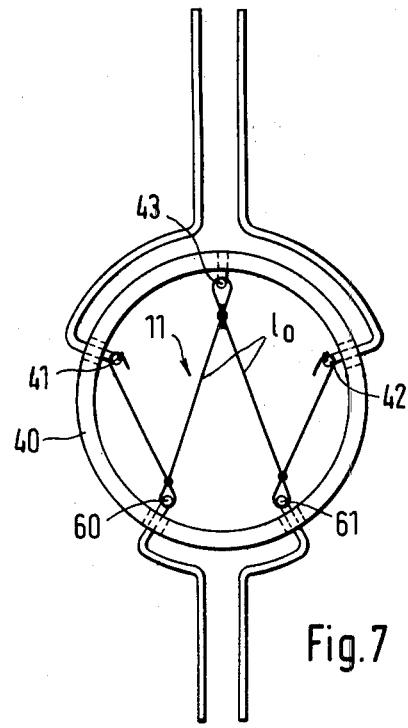
FIG. 7 shows a W-shaped guidance of a hot wire in a probe ring, with separate current leads for the measuring process and for the purging annealing step.

In the embodiment shown in FIG. 7, the hot wire 11 is extended in a W-shape in the probe ring 40 through five anchoring points 41, 42, 43, 60, 61, in which the anchoring points symmetrical to the central anchoring point 43 are supported in an electrically insulated fashion within the probe ring 40. The hot wire 11 is electrically conductively attached to anchoring points 41, 42, 60, 61, symmetrical to the central anchoring point 43. During the measuring step of the hot wire 11, the current supply to the hot wire is supplied via the anchoring points 60 and 61, so that an active hot wire length $l_o$ results between the anchoring points 60, 43, 61. Preferably, the hot wire 11, as described hereinabove, is guided in a loop shape at the anchoring points and is electrically conductively mounted at the anchoring points 60 and 61. To ensure that the active hot wire length $l_o$ is heated to a sufficient temperature during the purging burning step, the current is supplied to the hot wire during the purging burning step via the end anchoring points 41, 42. The hot wire sections between the anchoring points 41, 60 and 42, 61 are designed so that a quantity of heat is removed therefrom during the purging burning step and transferred to the anchoring points 60 and 61, respectively, whereby the amount of heat conducted away from the active hot wire length $l_o$ is so small that during the purging burning step the active hot wire length $l_o$ is heated even in the zone of the anchoring points 60, 61 to a high temperature as required for burning off the deposits.

Figures 8, 9, 10:
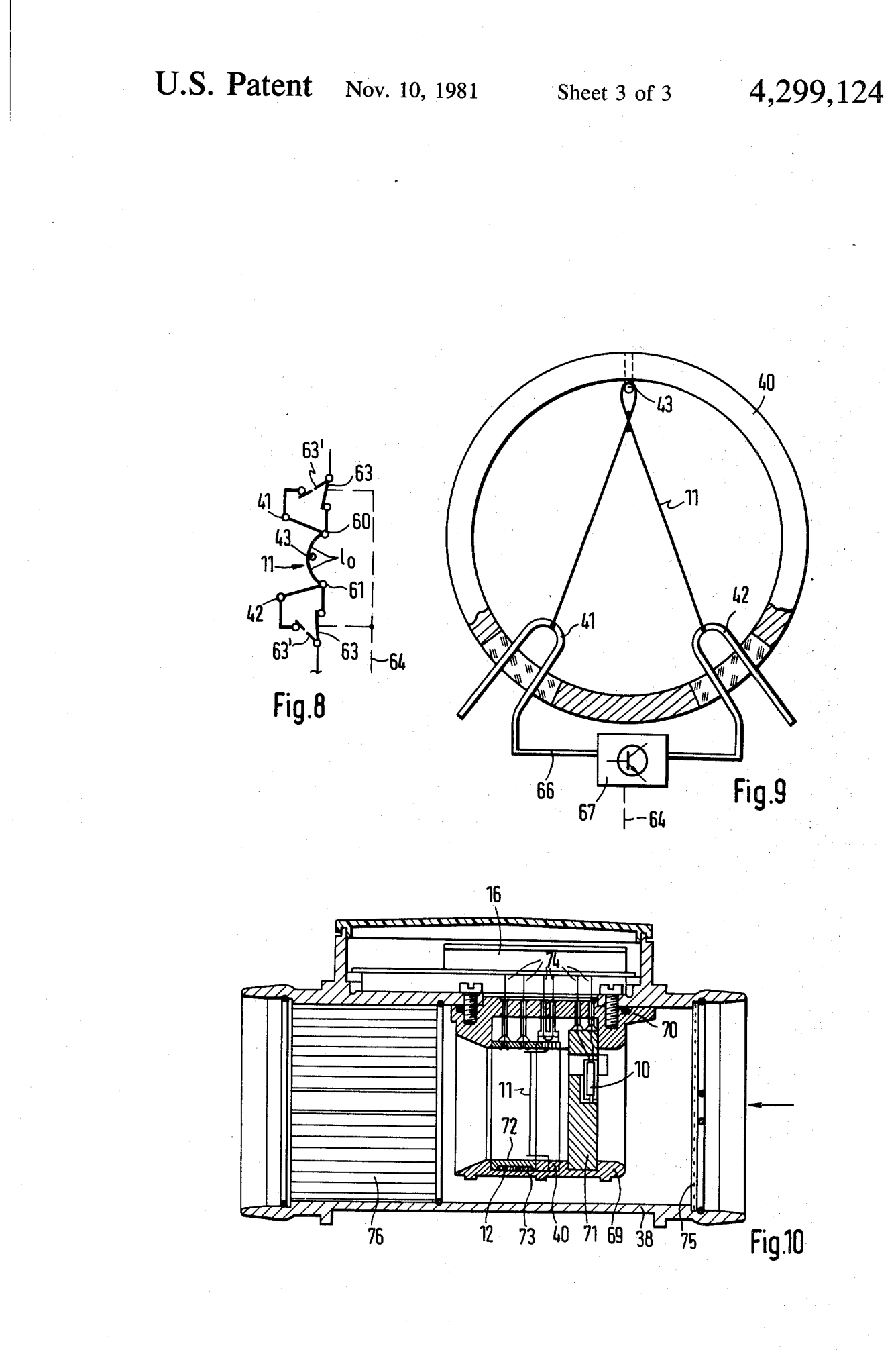

FIG. 8 is a fragmentary view of part of the circuit diagram of FIG. 1 with a hot wire 11 extended in a W-shape through anchoring points 41, 60, 43, 61, 42 corresponding to the embodiment of FIG. 7. In this arrangement, a switching device 63 is provided which is controllable via a line 64, shown in dashed lines, by control signals from the monostable multivibrator 33.

During the measuring procedure of the hot wire, the switching device 63 connects the anchoring points 60 and 61 to the electrical control device 16, so that the active hot wire length $l_o$ has current passing therethrough. Upon an interruption of the measuring step, the switching device 63 cuts off the current supply to the anchoring points 60, 61 and connects, as indicated at 63′ in dashed lines, the end anchoring points 41, 42 to the electrical control device 16; consequently, during the purging burning step, the entire hot wire length between anchoring points 41, 60, 43, 61, 42 is traversed by current.

A further possibility for reducing the heat dissipation from the hot wire 11 to the end anchoring points 41, 42 during the purging burning step and thus ensuring that the entire active hot wire length is sufficiently highly heated during the purging burning step, is illustrated in FIG. 9. Here, the end anchoring points 41, 42 are connected by an electrical line 66 and line 66 is interrupted during the measuring step of the hot wire 11 by means of a switching device 67 (see also FIG. 1).

Upon an interruption of the measuring process, the switching device 67 is activated by a signal from the monostable multivibrator 33 via line 64 in such a way that the switching device closes and current can flow via line 66 between the end anchoring points 41, 42. Consequently, the end anchoring points, with suitable dimensioning, are heated to such an extent that the temperature gradient between the hot wire ends and the end anchoring points 41, 42 is diminished, and the hot wire ends reach the temperature level required during the purging burning step for burning off the deposits.

FIG. 10 shows, in a simplified illustration, the arrangement of a device for measuring the intake air mass of an internal combustion engine in a measuring tube 38 attached to the intake manifold, the flow passing through in the direction of the arrow. The probe ring 40 is provided in a supporting member 69 which can be connected to the measuring tube 38 by way of at least one connecting lug 70.

Upstream of the hot wire 11 extended within the probe ring 40, the temperature-dependent resistor 10 is arranged in the air stream for compensation of the intake air temperature. This resistor 10 is attached to a supporting element 71. Downstream of the hot wire 11, the reference resistor 12, made, for example, of "Manganin" wire or "Manganin" film, is mounted to the supporting member 69 so that the heat produced at this resistor 12 is maximally thoroughly removed by the passing air. The reference resistor 12 can be arranged, for example, in the interior of a ring 72 arranged in the supporting member 69 or it can be provided, as illustrated, in a groove 73 of the outer circumference of the ring 72. Connecting wires 74 of resistors 10, 11, 12 lead to the electrical control device 16.

Upstream of the supporting member 69, a grid-shaped contact protection element 75 can be provided and downstream a grid-shaped protective element 76 can be disposed for avoiding damage to the hot wire 11 in case of intake manifold backfirings in the intake manifold 38.

What is claimed and desired to be secured by Letters Patent of the United States is:

1. A device for measuring the mass of a flowing medium, especially for measuring the intake air mass of internal combustion engines comprising at least one temperature-dependent resistor arranged in the stream of the flowing medium, the temperature and/or resistance of this resistor being controlled in dependence on the mass of flowing medium and wherein a control variable is a measure of the mass of the flowing medium, said temperature-dependent resistor being provided in the form of a hot wire having a pair of metal junction ends, a probe ring having at least three anchoring points, said hot wire extending from one metal junction end to the other metal junction end via said at least three anchoring points, said hot wire having a loop portion extending around one of said at least three anchoring points to form intersecting wire sections, said intersecting wire sections being connected with each other at a connecting point in an electrically conductive relationship, the ends of said hot wire being formed as loops and extend around a respective end anchoring point, each of said wire end loops having intersecting wire sections connected with each other at a connecting point in electrically conductive relationship.

2. A device according to claim 1, wherein said end loops are welded or soldered to said end anchoring points.

3. A device according to claim 1, including a low-ohmic current lead wire formed of a noble metal or the like electrically conductively attached to each of said connecting points of said intersecting wire sections of said end loops, whereby an electrical connection of said hot wire is established by way of an other end of each of said current lead wires.

4. A device according to claim 3, wherein said other ends of said current lead wires facing away from the hot wire are connected to current-conducting elements spaced within said probe ring corresponding to said anchoring points and at least three means for electrically insulating said current-conducting elements with respect to said at least three anchoring points.

5. A device for measuring the mass of a flowing medium, especially for measuring the intake air mass of internal combustion engines comprising at least one temperature-dependent resistor arranged in the stream of the flowing medium, the temperature and/or resistance of this resistor being controlled in dependence on the mass of flowing medium and wherein a control variable is a measure of the mass of the flowing medium, said temperature-dependent resistor being provided in the form of a hot wire having a pair of metal junction ends, a probe ring having at least three anchoring points, said hot wire extending from one metal junction end to the other metal junction end via said at least three anchoring points, said hot wire having a loop portion extending around one of said at least three anchoring points to form intersecting wire sections, said intersecting wire sections being connected with each other at a connecting point in an electrically conductive relationship, the ends of said hot wire being attached to the end anchoring points at a mounting point and including a low-ohmic current lead wire of a noble metal or the like, electrically conductively connected to each of said end anchoring points, an other end of each of said current lead wires being electrically conductively connected to said hot wire in a relatively small spaced relationship with said mounting point of said hot wire at said end anchoring point.

6. A device for measuring the mass of a flowing medium, especially for measuring the intake air mass of internal combustion engines comprising at least one temperature-dependent resistor arranged in the stream of the flowing medium, the temperature and/or resistance of this resistor being controlled in dependence on the mass of flowing medium and wherein a control variable is a measure of the mass of the flowing medium, said temperature-dependent resistor being provided in the form of a hot wire having a pair of metal junction ends, a probe ring having at least three anchoring points, said hot wire extending from one metal junction end to the other metal junction end via said at least three anchoring points, said hot wire having a loop portion extending around one of said at least three anchoring points to form intersecting wire sections, said intersecting wire sections being connected with each other at a connecting point in an electrically conductive relationship, said probe ring being provided with five anchoring points supported in an electrically insulated manner in said probe ring and wherein said hot wire extends in a W-shape in said probe ring throughout said five anchoring points and wherein one of said five anchoring points forms a central anchoring point with four of said anchoring points are arranged in two pairs symmetrically with respect to said central anchoring point, and wherein said hot wire is electrically conductively connected to said four anchoring points.

7. A device according to claim 6 including an electrical control device, a plurality of current leads for connecting said symmetrically disposed four anchoring points to said electrical control device and a switching device for connecting said hot wire to a current source during a measuring step, via the one of said anchoring points in each of said pairs of anchoring points and, upon an interruption of said measuring step via the other anchoring point in each of said pairs of anchoring points.

8. A device according to claim 7, wherein said hot wire is provided with loop portions, each extending around said one of said anchoring points in each of said pairs of anchoring points to form intersecting wire sections and wherein said intersecting wire sections are electrically conductively connected with each other.

9. A device according to claim 1, 5 or 6 including means for heating said end anchoring points upon an interruption of the measuring step of said hot wire.

10. A device according to claim 9, including an electrically conductive connection having a switching device between said end anchoring points for connecting said end anchoring points to an associated source of power, said switching device being arranged to interrupt said electrically conductive connection during the measuring step of said hot wire and, upon interruption of said measuring step, to close said connection whereby, with current flowing via said connection, said end anchoring points are heated by said associated source of power.

11. A device according to claim 1, 5 or 6 including an associated temperature-dependent resistor for temperature compensation connected in a bridge circuit with said hot wire and directly to said hot wire, a supporting member mounted in a flow cross section of said flowing medium, said associated temperature-dependent resistor being mounted in said supporting member in series in the flow of the medium passing through said flow cross section and at lease one reference resistor on said supporting member downstream of said hot wire for supplementing said bridge circuit.

* * * * *